US012660879B2

(12) United States Patent
Stucko

(10) Patent No.: US 12,660,879 B2
(45) Date of Patent: Jun. 23, 2026

(54) SUSTAINABLE WEARABLE ITEM AND METHOD OF MANUFACTURING SAME

(71) Applicant: Jennifer Stucko, New York, NY (US)

(72) Inventor: Jennifer Stucko, New York, NY (US)

( * ) Notice: Subject to any disclaimer, the term of this patent is extended or adjusted under 35 U.S.C. 154(b) by 0 days.

(21) Appl. No.: 17/538,297

(22) Filed: Nov. 30, 2021

(65) Prior Publication Data

US 2022/0167705 A1     Jun. 2, 2022

Related U.S. Application Data

(60) Provisional application No. 63/120,099, filed on Dec. 1, 2020.

(51) Int. Cl.
| | |
|---|---|
| *A43B 1/025* | (2022.01) |
| *A43B 23/02* | (2006.01) |
| *B29D 35/14* | (2010.01) |

(52) U.S. Cl.
CPC .......... *A43B 1/025* (2022.01); *A43B 23/0235* (2013.01); *A43B 23/024* (2013.01); *A43B 23/0255* (2013.01); *B29D 35/146* (2013.01)

(58) Field of Classification Search
CPC .... A43B 1/025; A43B 23/0235; A43B 23/024
See application file for complete search history.

(56) References Cited

U.S. PATENT DOCUMENTS

| | | | | |
|---|---|---|---|---|
| 8,822,176 B2 * | 9/2014 | Day | ........................... | C11B 3/02 424/195.17 |
| 2010/0242307 A1 * | 9/2010 | Gallas | .................... | A43B 5/001 36/34 R |

| | | | | |
|---|---|---|---|---|
| 2017/0136737 A1 * | 5/2017 | Zaddack | ................. | B32B 21/02 |
| 2021/0180247 A1 * | 6/2021 | Hironaka | ............. | D06N 3/0052 |
| 2022/0048226 A1 * | 2/2022 | Pappu | ................... | B29C 43/146 |
| 2022/0211554 A1 * | 7/2022 | Kakitsuba | ........... | A61F 13/8405 |
| 2022/0295924 A1 * | 9/2022 | Hofmann | ............. | G06F 3/0393 |
| 2023/0053954 A1 * | 2/2023 | Shao | ........................ | D06N 3/04 |

FOREIGN PATENT DOCUMENTS

| | | | | |
|---|---|---|---|---|
| CN | 110344276 A | * | 10/2019 | .............. D21D 1/02 |
| KR | 20210106643 A | * | 2/2020 | |
| KR | 102400006 B1 | * | 12/2021 | |

(Continued)

OTHER PUBLICATIONS

Wang Jessica, Nov. 14, 2018, English Machine Translation_WO2020/102552A1 provided by Patent Translate by EPO and Google (Year: 2018).*

(Continued)

*Primary Examiner* — Alissa L Hoey
*Assistant Examiner* — Akwokwo Olabisi Redhead
(74) *Attorney, Agent, or Firm* — James J. DeCarlo; Greenberg Traurig, LLP

(57) ABSTRACT

A sustainable wearable item is provided. The sustainable wearable item comprising an outer layer comprising a plant-based material, an inner layer comprising a plant-based material, the inner layer configured to contact the skin of a user; and an adhesive disposed between the outer layer and the lining and configured to bind the outer layer to the lining, wherein the adhesive is activated in a bonding process.

9 Claims, 4 Drawing Sheets

100

(56) References Cited

FOREIGN PATENT DOCUMENTS

WO      WO-2020102552 A1 *   5/2020   ............... A43B 1/02

OTHER PUBLICATIONS

Wang Xiwen, Jun. 29, 2019, English Machine Translation_ CN110344276A provided by Patent Translate by EPO and Google (Year: 2019).*

Jeoung Sung Don, Feb. 21, 2020, English Machine Translation_ KR20210106643A provided by Patent Translate by EPO and Google (Year: 2020).*

Kim Tae Hoon, Dec. 16, 2021, English Machine Translation_ KR102400006B1 provided by Patent Translate by EPO and Google (Year: 2021).*

Line Cowley, "5 Innovative Textile Solutions for Vegans", (18JUN2020). Online. Web. https://ecoworldonline.com/5-innovative-textile-solutions-for-vegans/ (Year: 2020).*

* cited by examiner

100

110

104

102

108

103

106

105

300

400

402

404

406

500

502

504

506

SUSTAINABLE WEARABLE ITEM AND METHOD OF MANUFACTURING SAME

RELATED APPLICATIONS

This application claims the benefit of priority from U.S. Provisional Application No. 63/120,099, filed Dec. 1, 2020, which is incorporated herein by reference in its entirety.

FIELD OF THE INVENTION

The present disclosure relates to sustainable wearable items and, in particular, to footwear manufactured using upcycled, recycled, recyclable, and regenerated materials.

BACKGROUND

As sustainability becomes a central requirement for manufacturers and consumers, fashion trends are trying to catch up with sustainability trends.

However, fashion designers and manufacturers have lagged on the development of truly sustainable clothing and footwear that is also stylish and durable. Selecting appropriate materials to use in sustainable wearable items has proven difficult as most materials do not cooperate together to assemble a satisfactory end product. Many sustainable materials are not thick nor durable enough and would tear or deform when used to assemble, for instance, a shoe.

Additionally, selecting the right material is only part of the problem. Finding an appropriate thickness for each material that allowed for a resilient and durable final product while withstanding the stresses of manufacturing and achieving a desirable finish is equally challenging.

Resistance to snagging, pilling, and abrasion, as well as increased bursting strength and recovery are all substantial properties desirable in footwear. However, achieving these qualities is a problem with most sustainable materials, especially when applied to footwear. In some cases, a material may be abrasion resistant, but may lack high recovery power. A similar challenge arises when selecting an appropriate adhesive to bind the several layers of the several components of the wearable item. To achieve effective and durable adhesion, some adhesives require application temperatures and pressures that are inconsistent with desirable sustainable materials. In some cases, a material may be durable, but it may not readily bind to another material using traditional techniques (i.e., temperatures and drying times).

SUMMARY

This disclosure provides a novel process of manufacturing wearable items using sustainable materials that results in a strong, smooth and durable final product while also being aesthetically desirable.

An aspect of the present disclosure is a layer arrangement of a wearable item including an upper or outer layer comprising an upcycled apple skin material. In an embodiment, the wearable item also includes a lining comprising an upcycled grape skin material. In some embodiments, the upper or outer layer may be bonded to the lining using an adhesive. In some embodiments, the upcycled grape skin material may be coated to increase durability. In some embodiments, the coated upcycled grape skin material results in a uniform, wipe clean surface that is economical to produce.

Another aspect of the present disclosure is a layer arrangement of a wearable item including an insole and an outsole bonded with an adhesive. In some embodiments, an insole is also referred to as a lining. In an embodiment, the insole comprises an upcycled grape skin material. In an embodiment, the outsole comprises a vegetable tanned leather. In some embodiments a layer arrangement may further include a molded insole. In some embodiments, the molded insole includes recycled carboard to add stiffness to the layer arrangement. In some embodiments a layer arrangement of a toe puff may include upcycled plastic.

While embodiments described herein related to footwear, other wearable items such as boots, slippers, sneakers, handbags, belts, wallets, satchels, backpack or other items traditionally made of unsustainable leather or synthetic materials are also within the scope of this disclosure.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
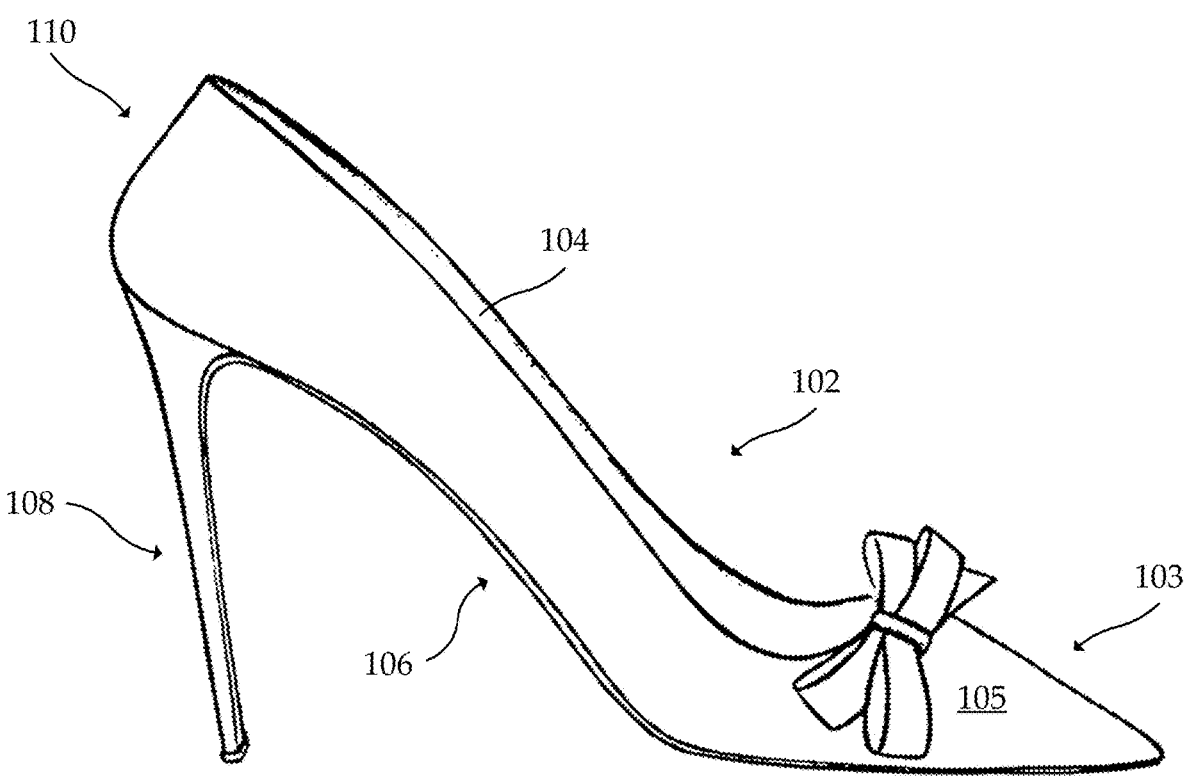
FIG. 1 is a side view of a sustainable wearable item in accordance with embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, articles components, or compositions.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As used herein the term "upper" refers to the part of a shoe that covers the foot. In some embodiments, the upper of a shoe includes all parts or sections of the shoe above the sole. In some embodiments, the upper of the shoe includes a vamp or front of the shoe, the quarters (i.e., the sides and back of the shoe), and the linings. In some embodiments, the upper may include an upper layer. In those embodiments the upper layer may be referred to as an outer layer.

As used herein the term "lining" refers to the part of a shoe that contact the sides, top, and heel of a foot or a skin of a user. In some embodiments, the lining may cover an inside seam of the shoe. In some embodiments, the lining protects the inside of the show and lengthens the shoe's lifespan. In some other embodiments, linings may be manufactured out of materials that add cushion and comfort to the shoe and draw out moisture. In some embodiments, the lining may be referred to as an inner layer.

As used herein the term "insole" refers to a piece of material placed inside footwear. Generally, insoles are intended to make shoes more comfortable to wear. In some embodiments, insoles add comfort, warmth, and allow for a better fit. Sometimes insoles are referred to as "foot beds" or "inner soles." In some embodiments, the insole may be referred to as an inner layer.

As used herein the term "outsole" refers to the outer sole or bottom of a shoe. In some embodiments, at least a portion of the outsole contacts the ground. In some embodiments, the outsole may be referred to as an outer layer.

As used herein the term "heel layer" refers to the portion of the shoe protruding from the outsole to raise and support the back of the foot. In some embodiments, the heel layer may include several layers of materials. In some embodiments, the heel layer can be a single piece of material.

As used herein the term "heel" refers to material inside of the shoe that creates height.

As used herein the term "insole cushion" refers to material between the insole and the outsole. In some embodiments, the insole cushion is a firm material that provides support to the construction of the shoe.

As used herein the term "counter" refers to the portion of the shoe forming the back of the shoe to give support to the user and stiffen the material around the heel of the foot.

As used herein the term "toe puff" refers to a piece of material disposed between lining and the outside of the upper as a stiffer. In some embodiments, the toe puff may include a fabric and a metal.

As used herein the term "molded insole" refers to a material disposed between the insole cushion and the insole.

As used herein the term "upcycled" refers to the process of recycling material in such a way that the resulting product is greater in value than the original item for new use to minimize the flow of waste into landfills.

As used herein the term "recycled" refers to the use of materials that have been extracted, reclaimed, and reconditioned for a new use to minimize the flow of waste into landfills.

As used herein the term "tannery waste" refers to post-production leather scraps.

As used herein the term "nickel free metal" refers to metal with little to no nickel.

As used herein the term "recycled cardboard" refers to cardboard that has been reused to make a new material.

FIG. 1 is a side view of a sustainable wearable item 100 in accordance with embodiments of the present disclosure. In an embodiment, the sustainable wearable item 100 is a shoe. In an embodiment, a sustainable wearable item 100 may include an upper 102, a toe puff 103, a lining 104, an outsole 106, a heel 108, and a counter 110. While not shown, in an embodiment, a sustainable wearable item 100 may also include an insole, and a molded insole. In some embodiments, some or all of the components of a wearable item 100 include recycled, upcycled, recyclable, and regenerated materials. In an embodiment, at least one of an upper 102, a toe puff 103, a lining 104, an outsole 106, a heel 108, a counter 110, an insole, and a molded insole may be secured to at least one other component through a bonding process using an adhesive as described elsewhere herein. In some embodiments, the upper may include a layer arrangement including the lining 104 and an upper layer 105.

In an embodiment, an upper comprises an upper material. In some embodiments, the upper material may be an upcycled apple skin material. In some embodiments, an upcycled apple skin material may be a plant-based leather alternative composed of the post- production scraps of apple waste and polyurethane. In an embodiment, the upper material may be a material similar to APPLESKIN™ manufactured by FRUMAT S.r.L./MABEL S.r.L. of Italy. In an embodiment, the upper material may have a thickness between about 0.90 mm and 1.10 mm. In an embodiment, the upper material may have a thickness of about 1.00 mm. In an embodiment, the upper material may have a thickness smaller than 0.90 mm. In an embodiment, the upper material may have a thickness larger than 1.10 mm. Those skilled in the art that the thickness of the upper material may differ between embodiments and may be chosen to suit the style, shape, and function of the wearable item. In an embodiment, the upper may have a material composition including at least one of apple (~26%, +/−2%), polyester (~20%, +/−2%), cotton (~16% +/−2%), and polyurethane (~38% +/−2%).

In some embodiments, the upper may be scratch resistant. In some embodiments, the upper may comprise an upper coating to provide scratch resistance. In some embodiments, the upper coating may be a transparent coating. In some embodiments, the upper coating may be a polyurethane coating. In some embodiments, the upper coating may be a polyurethane coating manufactured by FRUMAT S.r.L. of Italy. In some embodiments, the upper coating may be selected to provide a desired abrasion resistance, texture, consistency, and durability. In an embodiment, the upper coating may have a thickness not to exceed one-third of the combined thickness of the upper material and the upper coating. In some embodiments, the upper coating thickness may not exceed 0.15 mm.

In an embodiment, a lining comprises a lining material. In some embodiments, the lining material may be an upcycled grape skin material. In some embodiments, upcycled grape skin material may be a plant-based leather alternative composed of the post-production scraps of grape waste and water-based polyurethane. In an embodiment, a lining material may be a material similar to Article VT16 manufactured by VEGEA S.r.L. of Italy. In an embodiment, a lining material may have a thickness between about 0.80 mm and 1.00 mm. In an embodiment, a lining material may have a thickness of about 0.90 mm. In an embodiment, a lining material may have a thickness smaller than 0.80 mm. In an embodiment, a lining material may have a thickness larger than 1.00 mm. Those skilled in the art that the thickness of the lining material may differ between embodiments and may be chosen to suit the style, shape, and function of the wearable item. In an embodiment, the lining may have a material composition including at least one of an eco-composite of grape skins (~70%) and a water-based polyurethane (~30%).

In some embodiments, the lining is scratch resistant. In some embodiments, the lining may comprise a lining coating to provide scratch resistance. In some embodiments, the lining coating may be a transparent coating. In some embodiments, the lining coating may be a water-based polyurethane coating. In some embodiments, the water-based polyurethane coating may be manufactured by FRU-MAT S.r.L. of Italy. In some embodiments, the water-based polyurethane coating may be manufactured by VEGEA S.r.L. of Italy. In some embodiments, the lining coating may be selected to provide a desired abrasion resistance, texture, consistency, and durability. In an embodiment, the lining coating may have a thickness not to exceed one-third of the combined thickness of the lining material and the lining coating. In some embodiments, the lining coating thickness may not exceed 0.15 mm.

In an embodiment, the insole comprises an insole material. In some embodiments, the insole material may be an upcycled grape skin material. In an embodiment, an insole material may be a material similar to Article VT16 by VEGEA S.r.L. of Italy. In an embodiment, an insole material may have a thickness between about 0.80 mm and 1.00 mm. In an embodiment, an insole material may have a thickness of about 0.90 mm. In an embodiment, an insole material may have a thickness smaller than 0.80 mm. In an embodiment, an insole material may have a thickness larger than 1.00 mm. Those skilled in the art that the thickness of the insole material may differ between embodiments and may be chosen to suit the style, shape, and function of the wearable item. In an embodiment, an insole may have a material composition including at least one of an eco-composite of grape skins (~70%) and a water-based polyurethane (~30%).

In some embodiments, the insole is scratch resistant. In some embodiments, the insole may comprise an insole coating to provide scratch resistance. In some embodiments, the insole coating may be a transparent coating. In some embodiments, the insole coating may be a water-based polyurethane coating. In some embodiments, the insole coating may be a water-based polyurethane coating manufactured by FRUMAT S.r.L. of Italy. In some embodiments, the water-based polyurethane coating may be manufactured by VEGEA S.r.L. of Italy. In some embodiments, the insole coating may be selected to provide a desired abrasion resistance, texture, consistency, and durability. In an embodiment, the insole coating may have a thickness not to exceed one-third of the combined thickness of the insole material and the insole coating. In some embodiments, the insole coating thickness may not exceed 0.15 mm.

In an embodiment, the molded insole comprises a molded insole material. In some embodiments, the molded insole material may be a recycled-carboard based material. In an embodiment, the molded insole material may be a material similar to ECOSOLEE® by Texon Italia S.r.L. of Italy. In an embodiment, a molded insole material may be composed of recycled tree fibers.

In an embodiment, the insole cushion comprises an insole cushion material. In some embodiments, the molded insole material may be a foam rubber. In some embodiments, the molded insole material may be a recyclable material. In some embodiments, the molded insole material may be a recycled material. In an embodiment, the insole cushion material may have a thickness selected to match a desired comfort and durability.

In an embodiment, the outsole comprises an outsole material. In some embodiments, the outsole material may be a vegetable tanned leather. In some embodiments, vegetable tanned leather may be leather that is tanned with natural tannins from tree bark and chestnut extract and is chemical free. In an embodiment, the outsole material may be a vegetable tanned leather manufactured by CONCERIA 3S S.r.L. of Italy. In some embodiments, the outsole material may be a water-resistant material. In some embodiments, the outsole material may be a sustainable material. In an embodiment, the outsole may have a material composition including at least one of animal leather (~60%), plant extracts (~15%), water (~15%), and vegetable origin tanning (~10%).

In an embodiment, the toe puff comprises a toe puff material. In some embodiments, the toe puff material may be recycled ethylene-vinyl acetate ("EVA"). As will be noted, EVA is a copolymer of ethylene and vinyl acetate. In some embodiments, recycled EVA may be a reusable plastic waste that is soft and flexible with a rubber- like feel. In an embodiment, the toe puff material may be TALYN® S by Technogi S.p.A. of Italy. In some embodiment, the toe puff material comprises EVA that would otherwise be manufacturing waste (e.g., cutting and skiving waste). In an embodiment, the toe puff material may have a thickness between about 0.30 mm and 1.00 mm. In an embodiment, the toe puff material may have a thickness smaller than 0.30 mm. In an embodiment, the toe puff material may have a thickness larger than 1.00 mm. Those skilled in the art that the thickness of the toe puff material may differ between embodiments and may be chosen to suit the style, shape, and function of the wearable item. In an embodiment, the outsole may have a material composition including recycled raw material (~41%) and manufacturing waste (~9%).

In an embodiment, the toe puff may be secured to at least one other layer by bonding. In an embodiment, the toe puff may be secured to the upper by bonding. In some embodiments, a bonding process may be accomplished using a pneumatic pressing machine equipped with heated curved plate, timer and thermostat. In some embodiments, during the bonding process the toe puff may be maintained at a temperature between 130 and 150 degrees Celsius. In some embodiments, the bonding process may have a minimum effective interface temperature of about 100 degrees Celsius. In some embodiments, the bonding process may have a contact time of about 6 to 12 seconds. It will be noted by those skilled in the art, that the contact time may vary depending on the thickness of the articles being bonded and the characteristics of the materials involved.

In an embodiment, the counter comprises a counter material. In some embodiments, the counter material may be regenerated leather. In some embodiments, regenerated leather may be made with materials that come from post-production of another product. For example, production scraps that did not deem fit for final production of a product or production scraps from the end of the production of a product. In some embodiments, regenerated leather may be leather that is produced when leather scraps go through a production process that compresses its fibers to create a new raw material. In an embodiment, the counter material may be regenerated leather as manufactured by Salamander Bonded Leather GmbH & Co. KG of Germany. In some embodiments, the counter material may be a material with good moldability, good shape retention and good elasticity.

In some embodiments, the counter material may be bonded leather. In some embodiments, bonded leather includes leather fibers from manufacturing waste (e.g., scraps). In some embodiments, bonded leather may be manufactured by shredding leather scraps and leather fiber, then mixing it with bonding materials. In some embodiments, regenerated leather exhibits to a great extent the same properties as the natural product leather typically used to make counters, therefore regenerated leather may be treated the same as natural leather. In an embodiment, the counter may have a thickness of between about 1.50 mm and 1.60 mm. In an embodiment, the counter may have a thickness smaller than 1.50 mm. In an embodiment, the toe counter may have a thickness larger than 1.60 mm.

In an embodiment, the heel comprises a heel material. In some embodiments, the heel material may be a plastic or polymer. In an embodiment, the heel material may be a material similar to ELIX™ ABS P2MC by ELIX Polymers SLU of Spain.

In an embodiment, the heel layer comprises a heel layer material. In some embodiments, the heel material may be a plastic. In an embodiment, the heel layer material may be a material as manufactured by Tacchificio Ares Plastic S.r.L. of Italy. As will be noted by those skilled in the art, plastics and polymers present advantages when used in heels and heel layers due to an increased durability in footwear applications.

As noted above, securing layers and components of wearable items may be achieved using adhesives. The following discussion relates to adhesives that may be used in sustainable wearable items. In an embodiment, an adhesive includes an adhesive material. In some embodiments, the adhesive may be a solvent-based polyurethane adhesive. As used herein the term "polyurethane" refers to a polymer composed of organic units joined by carbamate (urethane) links. In an embodiment, the adhesive may include poly-urethane resin in a blend of organic solvents. In an embodiment, the adhesive may be an adhesive similar to E.S. XM/87 Glue manufactured by FRATELLI ZUCCHINI S.p.A. of Italy.

In some embodiments, the adhesive may have a transparent appearance. In some embodiments, the adhesive may have an opalescent clear appearance. In some embodiments, the adhesive may be a liquid. In an embodiment, an adhesive may have a viscosity of about 1800-2100 mPas when measured using viscometer similar to viscometers manufactured by AMETEK® Brookfield of Middleboro, MA on a 4-spindle setting at 50 RPM and 25 degrees Celsius.

In some embodiments, prior to a bonding process using an adhesive as described herein, the components to be bonded may be brushed or roughed to create a better bond when compared to comparatively smoother surfaces.

In some embodiments, where it is necessary to improve adhesive penetration, a primer may be used. In some embodiments, to improve adhesive penetration, an accelerator may be used with the primer. In an embodiment, the primer is a primer similar to Primer 144/F manufactured by FRATELLI ZUCCHINI S.p.A. of Italy. In an embodiment, the primer is a primer similar to Primer C manufactured by FRATELLI ZUCCHINI S.p.A. of Italy. In an embodiment, the accelerator is an accelerator similar to Desmodur RE/RFE manufactured by FRATELLI ZUCCHINI S.p.A. of Italy.

In an embodiment, prior to the bonding process the components to be bonded may be cleaned using a solvent. In some embodiments, the solvent is a solvent similar to Solvente ST/141 manufactured by FRATELLI ZUCCHINI S.p.A. of Italy.

In an embodiment, during the bonding process, a coat of adhesive is applied onto the two surfaces to be bonded. In some embodiments, if a first coat of primer is required, the primer may be applied about 5-10 minutes in advance of applying the adhesive. In some embodiments, the adhesive may be left to dry between 20-30 minutes or for a period of time sufficient to allow the solvent to evaporate. The parts are then heated to a temperature ranging between 50 - 60 degrees Celsius to activate the adhesive. Once the adhesive is ready the two parts are brought together and a pressure force of approximately 4-5 bars is applied for approximately 10-12 seconds. In some embodiments, the high green strength and the ease of impact of the adhesive film may allow the bond to take place even if one of the parts is not sufficiently heated. In some embodiments, bond strength may gradually increase with time to reach a maximum value in 2 to 3 days after bonding.

Figure 2:
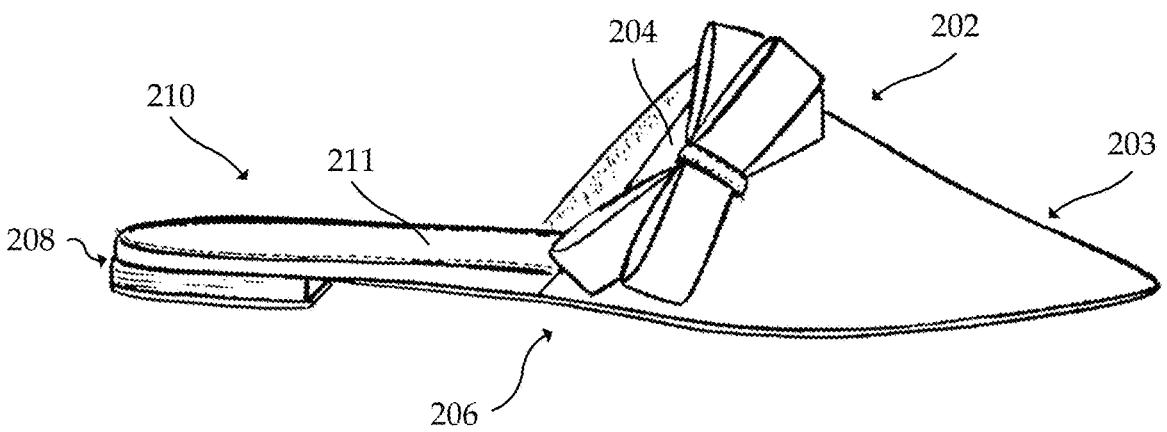
FIG. 2 is a side view of a sustainable wearable item in accordance with embodiments of the present disclosure.

FIG. 2 is a side view of a wearable item in accordance with embodiments of the present disclosure. In an embodiment, a sustainable wearable item 200 may include an upper 202, a lining 204, a toe puff 203, an outsole 206, a heel 208, an insole 210, and a molded insole 211.

Figure 3:
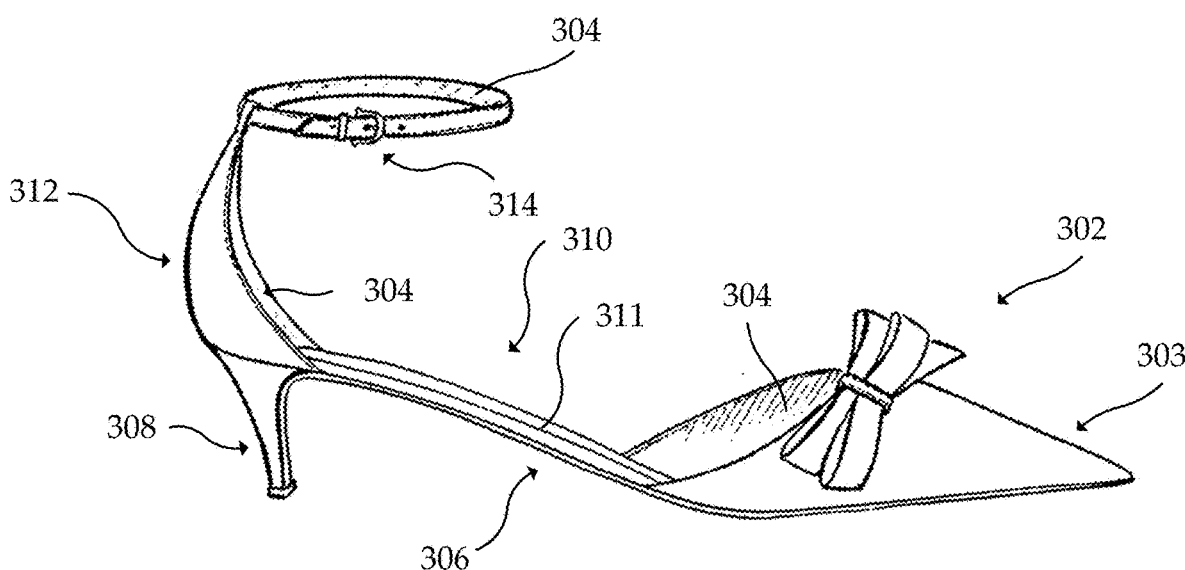
FIG. 3 is a side view of a sustainable wearable item in accordance with embodiments of the present disclosure.

FIG. 3 is a side view of a wearable item in accordance with embodiments of the present disclosure. In an embodiment, a sustainable wearable item 300 may include an upper 302, a toe puff 303, a lining 304, an outsole 306, a heel 308, an insole 310, a molded insole 311, a counter 312, and a clasp 314. In some embodiments, a clasp 314 is a buckle. As shown in FIG. 3, the clasp is used to secure part of the upper around the ankle of the user. In some embodiments, the clasp is a device with interlocking parts used to secure to pieces of material to each other. In some embodiments, the clasp may include a clasp material. In some embodiments, the clasp material may be a nickel free metal (i.e., metal substantially devoid of nickel) as manufactured by Metal Services S.r.L. of Italy.

Figure 4:
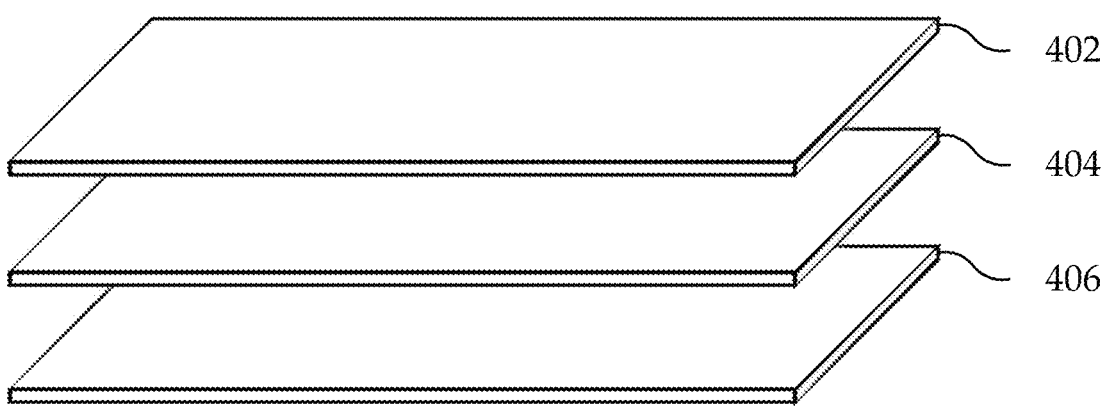
FIG. 4 is a schematic of a layer arrangement of a sustainable wearable item in accordance with embodiments of the present disclosure.

Referring now to FIG. 4, a layer arrangement 400 of a wearable item in accordance with embodiments of the present disclosure is described. In an embodiment, the layer arrangement 400 is a layer arrangement of an upper of a wearable item. In some embodiments, the upper may include an outer layer 402, an adhesive 404, and a lining 406. In some embodiments, the outer layer 402 is secured to the lining 406 with the adhesive 404 using a bonding process as described herein.

Figure 5:
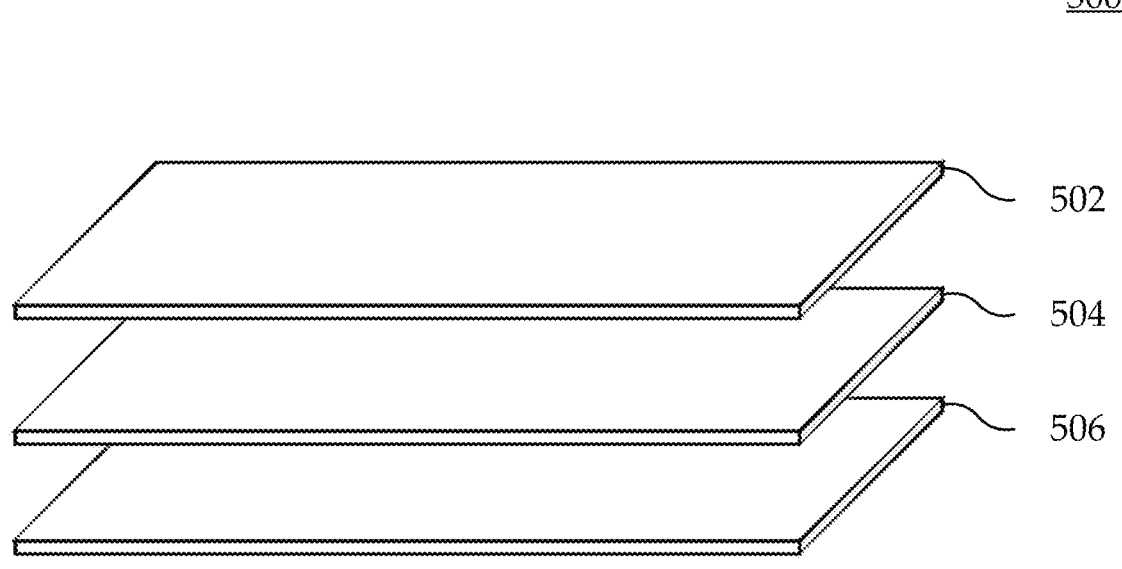
FIG. 5 is a schematic of a layer arrangement of a sustainable wearable item in accordance with embodiments of the present disclosure.

Referring now to FIG. 5, a layer arrangement 500 of a wearable item in accordance with embodiments of the present disclosure is described. In an embodiment, the layer arrangement 500 is a layer arrangement of a sole of a wearable item. In some embodiments, the sole may include an insole 502, an adhesive 504, and an outsole 506. In some embodiments, the insole 502 is secured to the outsole 506 with the adhesive 504 using a bonding process as described herein.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A sustainable wearable item comprising: an outer layer comprising a material composition of a plant-based material, cotton, polyurethane and polyester, wherein the plant-based material comprises an upcycled apple skin material, wherein the material composition comprises 26% apple (±2%), 20% polyester (±2%), 16% cotton (±2%), and 38% polyurethane (±2%) by total weight of the outer layer, wherein the outer layer-has a thickness between 0.90 mm and 1.10 mm, and wherein the outer layer is free of any fungal or mycelium-derived constituents, an inner layer comprising a plant-based material, wherein the inner layer is configured to contact skin of a user; and an adhesive layer disposed between the outer layer and the inner layer and wherein the adhesive layer is configured to bind the outer layer to the inner layer.

2. The sustainable wearable item of claim 1, wherein the outer layer has a thickness of 1 mm.

3. The sustainable wearable item of claim 1, wherein the plant-based material of the inner layer comprises an upcycled grape skin material.

4. The sustainable wearable item of claim 3, wherein the inner layer has a thickness between 0.80 mm and 1.00 mm.

5. The sustainable wearable item of claim 4, wherein the inner layer has a thickness of 0.9 mm.

6. The sustainable wearable item of claim 1, wherein the adhesive is a solvent-based polyurethane adhesive.

7. The sustainable wearable item of claim 1, wherein the adhesive is a water-based polyurethane adhesive.

8. The sustainable wearable item of claim 1, wherein the adhesive includes an accelerator.

9. A sustainable wearable item comprising: an outer layer comprising a composition of upcycled apple skin material, polyurethane, cotton, and polyester, wherein the outer layer comprises approximately 26% upcycled apple skin material (±2%), 20% polyester (±2%), 16% cotton (±2%), and 38% (±2%) polyurethane by total weight of the outer layer, wherein the outer layer has a thickness between 0.90 mm and 1.10 mm, and wherein the outer layer is free of any fungal or mycelium-derived constituents; an inner layer comprising an upcycled grape skin material, wherein the inner layer configured to contact skin of a user; an insole layer comprising an upcycled grape skin material, the insole layer comprising a scratch-resistant water-based polyurethane coating having a thickness not exceeding 0.15 mm; an adhesive disposed between the outer layer and the inner layer and configured to bind the outer layer to the inner layer; wherein the adhesive is activated in a bonding process.

* * * * *